June 13, 1950 — G. B. REEVES — 2,511,598
FILTER CLEANING MECHANISM
Filed April 5, 1946 — 2 Sheets-Sheet 1

Inventor:
George B. Reeves,
by Heard Smith & Tennant
Attorneys

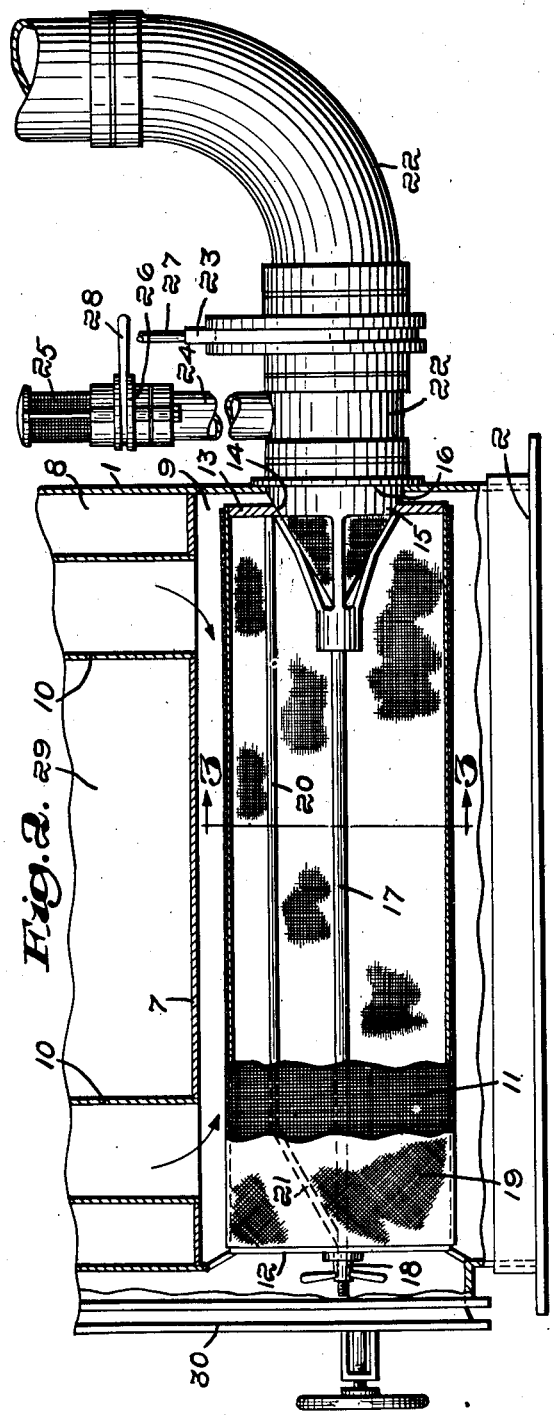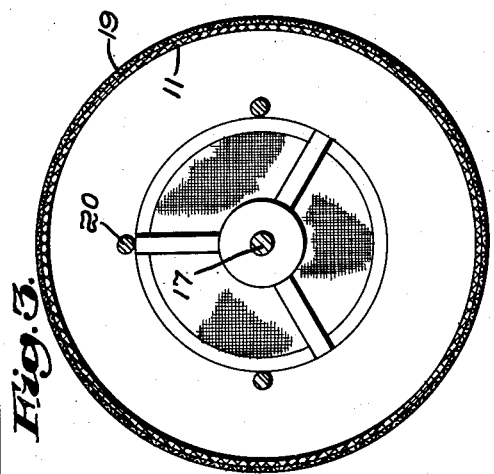

Patented June 13, 1950

2,511,598

UNITED STATES PATENT OFFICE 2,511,598

FILTER CLEANING MECHANISM

George B. Reeves, Fairfax, Ala., assignor to Abington Textile Machinery Works, Abington, Mass., a corporation of Massachusetts Application April 5, 1946, Serial No. 659,850

3 Claims. (Cl. 183—57)

This invention relates to filter cleaning mechanism for the receiver of a pneumatic card stripper and the principal object of the invention is to provide means for effectively cleaning the filter without removing the filter from the receiver.

Usual receivers for pneumatic card cleaning mechanism comprise an hermetically closed casing having a waste chamber into which the fibres and dust stripped from a carding cylinder are drawn by suction, the wall or walls of the waste chamber being provided with a screen or screens for establishing communication with a dust chamber.

A suitable filter is located in the dust chamber and the air which is exhausted in the casing is drawn through the filter, the dust chamber, the waste chamber and the suction head of the filter. By reason of this construction the fibrous material which is stripped from the cylinder is deposited in the waste chamber, the dust drawn through the screen into the dust chamber, and the dust removed by the filter as the dust-laden air is drawn through it. In such operation of the stripping mechanism the granular material of the dust accumulates upon the filter clogging the interstices thereof so that the degree of vacuum within the receiver and suction head is eventually reduced and the operation of the stripping correspondingly rendered ineffective.

Heretofore it has been necessary frequently to remove the filter and clean it. By reason of the present invention the filter can be readily and effectively cleaned without removing it from the receiver thereby saving the time which otherwise would be required for removing the cleaner and enabling the stripper to operate more effectively, and substantially continuously.

This is accomplished in the present invention by selectively interrupting the suction applied through the receiver and promptly introducing air under atmospheric pressure through the filter into the partial vacuum then existing in the air-evacuated receiver in a reverse direction to the normal suction-induced flow of the air, thereby discharging the material which is accumulated upon the filter into the dust chamber.

A further object of the invention is to provide filter-cleaning mechanism of the character above described which can be readily applied to usual standard receivers of pneumatic stripping mechanism without modification of the mechanism of the receiver.

These and other objects and features of the invention will more fully appear from the the following description and the accompanying drawings and will be particularly pointed out in the claims.

In the drawings:

Fig. 2 is an enlarged detail vertical sectional view on line 2—2 Fig. 1, and,

Fig. 3 is a vertical sectional view on line 3—3 Fig. 2 viewed from the left toward the right.

Figure 1:
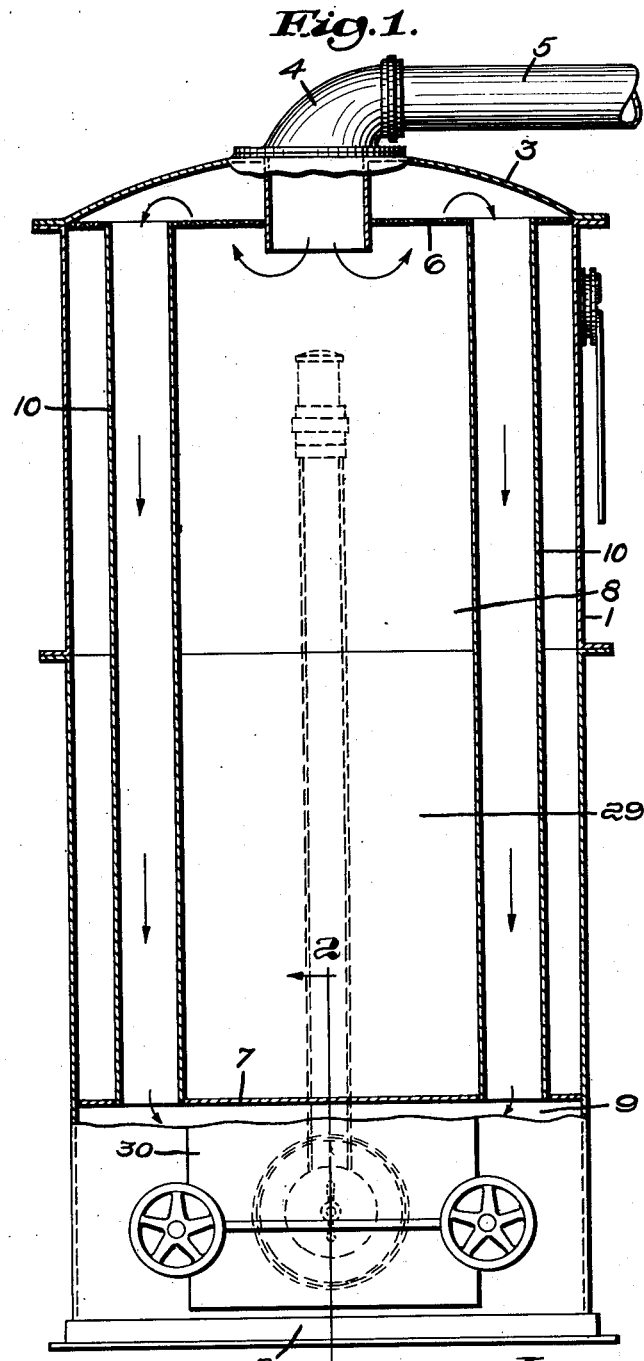
Fig. 1 is a view, mainly in longitudinal section, of a usual form of receiver for pneumatic card strippers.

The receiver illustrated in the accompanying drawings is one of a conventional type comprising a preferably vertical cylindrical casing 1 having a preferably cylindrical wall hermetically mounted upon a suitable base 2 and having a dome-shaped top 3 hermetically secured to the wall 1 with a pipe 4 extending into the casing adapted to be connected by a usual flexible pipe 5 to the suction head of the card stripper. The lower end of the pipe 4 extends through a horizontal screen 6 secured at its periphery to the junction of the dome and the cylindrical wall. A solid partition 7, which extends transversely across the lower end of the partition, divides the casing into an upper waste chamber 8 and a lower dust chamber 9. Suitable means are provided for establishing communication between the waste chamber 8 and the dust chamber 9 through the screen in or forming the wall of the waste chamber. As illustrated herein a plurality of pipes 10 are mounted upon and extend through the partition 7 and the screen 6. A suitable filter, preferably of cylindrical form, is located in the dust chamber and suction applied through the filter, the dust chamber 9, the waste chamber 8, the pipe 4 and therefrom through the flexible pipe 5 to the suction head, draws the material stripped from the card into the waste chamber in which the fibrous material is deposited while the dust is drawn through the screen wall of the dust chamber and the pipes 10 into the dust chamber where the granular material of the dust-laden current is deposited upon the filter.

In the construction illustrated the filter comprises a cylindrical wire screen 11 having a closed end 12 and an annular end 13 provided with an inwardly beveled edge 14 adapted to be seated upon a complementary base 15 of a conical spider having a flange 16 which is fixedly secured to the wall 1 of the casing. A rod 17, which is secured to the apex of the conical spider, extends axially through the head 12 of the filter and is provided with a screw threaded end which is engaged by a winged clamping nut 18 which upon being set up will clamp the annular end wall 13 of the cylindrical filter screen firmly upon the spider. A cylindrical fabric filter bag 19 fits upon and is releasably secured to the cylindrical filter screen 11.

Desirably a rod 20 extends from the spider above and in parallelism with and spaced from the axis of the spider nearly to the opposite end of the filter and is provided with a converging end 21 which is connected to the rod 17 thereby forming a guide by means of which the filter can be readily assembled upon the spider.

A suction conduit 22, which is suitably secured to the casing, communicates axially with the adjacent end of the filter as in usual constructions and extends therefrom to a suitable pump or other suction means as in usual constructions.

The present invention consists in providing means for shutting off the suction applied through the conduit 22 preferably in proximity to the casing 1 and providing means for introducing air under pressure into said conduit intermediate of the shut-off valve and the casing 1. In the present construction a preferably manually operable shut-off valve 23 is introduced in the conduit 22 a short distance from the casing 1 and a pipe 24 communicates with the conduit 22 intermediate of the shut-off valve 23 and the casing 1. The pipe 24 desirably has detachably secured to its upper end a cylindrical screen 25 and the pipe is provided with a manually operable valve 26 preferably in proximity to the screen 25, the handles 27 and 28 of the respective valves being located in convenient reach of an operator.

In the operation of the device suction is continuously maintained in the conduit 22 leading to the pump or other suction-creating means and the shut-off valve 23 is normally maintained in open position for operating the card stripper. When it is desired to clean the filter the shut-off valve 23 is moved to closed position, the valve 26 in the pipe 24 is then opened, thereby admitting air under atmospheric pressure to rush through the pipe 24, and the section of the conduit 22 intermediate of the shut-off valve and the casing into the cylinder in which partial vacuum is maintained after the shut-off valve is closed. The air thus rushing into the filter passes substantially uniformly through the meshes of the cylinder screen and the filter bag enclosing it thereby discharging the material which has accumulated upon the filter bag into the dust chamber where it settles to the bottom thereof and thereafter can be scraped out.

The casing 1 of the receiver is provided with suitable upper and lower doors 29 and 30 adapted to provide access to the waste chamber 8 and the dust chamber 9 so that the fibrous waste and the dust can be removed from the respective chambers.

It will be understood that the particular embodiments of the invention shown and described herein are of an illustrative character and that the present invention can be applied to other types of filtering mechanism or receivers of other constructions than that shown herein within the spirit and scope of the following claims.

Having thus described the invention, what is claimed as new, and desired to be secured by Letters Patent, is:

1. In combination with a pneumatic card stripper receiver having an hermetically closed casing containing a waste chamber communicating with the stripper head and having a screen in its wall, a dust chamber communicating with said waste chamber through said screen, a filter in said dust chamber and a suction conduit mounted on said casing leading from the chamber of said filter to suction-producing means mechanism for cleaning the filter comprising a shut-off valve in said conduit in proximity to said casing, an auxiliary pipe communicating with said suction conduit between said shut-off valve and said casing and a valve in said pipe adapted to be opened after the shut-off valve is closed thereby to admit air under atmospheric pressure into the evacuated receiver operable to discharge material accumulated on the filter into the dust chamber.

2. In combination with a pneumatic card stripper receiver having an hermetically closed casing containing in the upper portion thereof a waste chamber communicating with the card stripper head and having a screen in a wall thereof, a dust chamber below said waste chamber communicating with said waste chamber through said screen, a cylindrical filter screen in said dust chamber extending diametrically thereof covered by a filter cloth, a suction conduit mounted in said casing in axial alinement with said screen cylinder communicating with the chamber thereof and leading to a suction means mechanism for cleaning the filter comprising a shut-off valve in said suction conduit in proximity to said casing, an auxiliary pipe mounted on and communicating with said suction conduit between the shut-off valve and casing, and a normally closed valve in said pipe adapted to be opened upon closing of said shut-off valve to admit air under atmospheric pressure into the evacuated chamber of the receiver operable to discharge material accumulated on the filter cloth into the dust chamber.

3. In combination with a pneumatic card stripper receiver having an hermetically closed casing containing in the upper portion thereof a waste chamber communicating with the card stripper head and having a screen in a wall thereof, a dust chamber below said waste chamber communicating with said waste chamber through said screen, a cylindrical filter screen in said dust chamber extending diametrically thereof detachably mounted on the wall of said casing covered by a filter cloth, a suction conduit mounted on said casing in axial alinement with said screen cylinder communicating with the chamber thereof and leading to a suction means mechanism for cleaning the filter comprising a shut-off valve in said suction conduit in proximity to said casing, an auxiliary pipe mounted on and communicating with said conduit between the shut-off valve and the casing having a screen-covered upper inlet end, and a normally closed valve in said pipe below said screen adapted to be opened upon closing of said shut-off valve to admit air under atmospheric pressure into the evacuated chamber of the receiver operable to discharge material accumulated on the filter cloth into the dust chamber.

GEORGE B. REEVES.

REFERENCES CITED

The following references are of record in the file of this patent:

UNITED STATES PATENTS

| Number | Name | Date |
|---|---|---|
| 985,747 | Merrell | Feb. 28, 1911 |
| 1,784,339 | Clasen et al. | Dec. 9, 1930 |
| 1,843,639 | Hansen | Feb. 2, 1932 |
| 2,226,630 | McCord | Dec. 31, 1940 |
| 2,314,858 | Forsberg | Mar. 23, 1943 |

FOREIGN PATENTS

| Number | Country | Date |
|---|---|---|
| 693,467 | Germany | July 10, 1940 |
| 205,462 | Switzerland | Sept. 1, 1939 |

Certificate of Correction

Patent No. 2,511,598 June 13, 1950

GEORGE B. REEVES

It is hereby certified that errors appear in the above numbered patent requiring correction as follows:

In the grant, line 3, and in the heading to the printed specification, line 5, for "a corporation of Massachusetts" read *a trust of Massachusetts*; and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*